Patented Feb. 16, 1954

2,669,588

UNITED STATES PATENT OFFICE 2,669,588

PRODUCTION OF BIS(HYDROXYARYL) SUBSTITUTED COMPOUNDS

Philip H. Deming, Orinda, and Hans Dannenberg, Berkeley, Calif., assignors to Shell Development Company, Emeryville, Calif., a corporation of Delaware No Drawing. Application October 17, 1951, Serial No. 251,832

9 Claims. (Cl. 260—619)

This invention relates to the production of bis(hydroxyaryl) compounds and relates more particularly to the production of hydroxyphenyl-substituted alkanes wherein the nuclei of two phenolic radicals are directly attached to a single carbon atom in the alkyl group. A particular aspect of the invention relates to the production of gem(hydroxyphenyl) propane.

Hydroxyphenyl-substituted compounds such as, for example, the hydroxyphenyl-substituted alkanes are of great value in many important fields of application. They are employed as starting and intermediate materials in the production of a wide variety of organic products. Methods for their production disclosed heretofore generally involve the condensation of a phenolic compound with a carbonyl compound, for example, a ketone. Large scale production of hydroxyphenyl-substituted alkanes under economically feasible condition is therefore governed to some extent by the availability of the phenolic starting materials.

Potential sources of phenolic compounds comprise certain organo hydroperoxides such as certain aryl-alkyl hydroperoxides which may be obtained by the oxidation of the corresponding aromatic petroleum hydrocarbons. Methods have been disclosed heretofore for the decomposition of aralkyl hydroperoxides, such as cumene hydroperoxide at specific conditions of operation to reaction products comprising phenol. Utilization of such specific aralkyl hydroperoxides as a source of phenol for the large scale production of bis(hydroxyphenyl)-substituted alkanes is generally rendered highly impracticable because of difficult and complex operational procedures which must often be resorted to in order to separate from the aralkyl hydroperoxide decomposition products a phenolic product suitable for use as starting material in processes disclosed heretofore for the production of the desired hydroxyphenyl-substituted compound.

It has now been found that bis(hydroxyaryl) compounds are obtained directly from available substituted aromatic organo hydroperoxides by contacting a substituted aromatic organo hydroperoxide with a phenolic compound in an acid medium in the presence of a substantial amount of the phenolic reactant. Thus, in accordance with the invention bis(hydroxyphenyl) alkanes such as, for example, gem(4-hydroxyphenyl) alkanes, are produced by reacting an α,α-dialkyl-phenylmethyl hydroperoxide with phenol in the presence of a strong mineral acid and a mole ratio of phenol to α,α-diakylphenylmethyl hydroperoxide of at least 1:1. This is surprising and unexpected since it is indicated in the literature of prior art, as exemplified by British Patent 629,429, that under the conditions employed in processes available heretofore for the decomposition of aralkyl hydroperoxides the condensation of phenols with carbonyl compounds does not take place. The process of the invention, thus, brings within the realm of practicability the direct single stage production of hydroxyaryl-substituted compounds such as, for example, bis-(hydroxyphenyl) alkanes, from readily available aralkyl hydroperoxides.

The class of organo hydroperoxides reacted with a phenolic compound in accordance with the invention is represented by the empirical formula

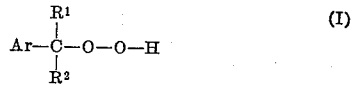

wherein Ar is an aromatic hydrocarbon radical selected from the group consisting of aryl and alkaryl groups which have at least one replaceable nuclear hydrogen atom and $R^1$ and $R^2$ each represent the same or a different member of the group consisting of hydrogen and any monovalent organic radical, aliphatic, cycloaliphatic, aromatic, heterocyclic, including hydrocarbon radicals such as alkyl, cycloalkyl, aryl, aralkyl, alkaryl, saturated and unsaturated groups. The radical Ar may be mono- or poly-nuclear. The radicals Ar, $R^1$ and $R^2$ may be further substituted by minor substituents such as methoxy, ethoxy, chloro, bromo, and nitro radicals. The organo hydroperoxide employed in the process of the invention may be obtained from any suitable source and include those obtained by the oxidation of aromatic organic compounds having the structural formula

wherein Ar, $R^1$, and $R^2$ have the same significance as in the previously described structural Formula I for the organo hydroperoxides.

Particularly advantageous organo hydroperoxide compounds employed in the present invention are the aralkyl hydroperoxides comprising the hydroperoxides of the alkyl benzenes which have at least one replaceable hydrogen atom directly attached to the benzene ring and in which the hydroperoxide group (—O—O—H)

is linked to an aliphatic carbon atom which is directly attached by a single bond to a nuclear carbon atom in the benzene ring. The suitable alkyl benzene hydroperoxides are represented by the empirical formula

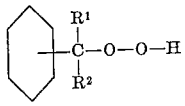
(II)

wherein the $R^1$ and $R^2$ represent the same or different members of the group consisting of hydrogen and hydrocarbon radicals such as alkyl, cycloalkyl, aryl, alkaryl, and aralkyl. The radical $R^1$ may be joined to the radical $R^2$ to form a cyclic nucleus containing the carbon atom to which the hydroperoxide group is attached. One or more replaceable hydrogen atoms attached to the benzene nucleus except at least one may be substituted by an aliphatic hydrocarbon radical such as alkyl and cycloalkyl radicals.

The above defined alkyl benzene hydroperoxides may be referred to as members of the class consisting of benzyl hydroperoxide and hydrocarbyl-substituted benzyl hydroperoxides such as alkyl- and cycloalkyl-substituted benzyl hydroperoxides.

Preferred are the secondary and tertiary alkyl benzene hydroperoxides wherein the hydroperoxyl (—O—O—H) group is attached to a secondary or tertiary carbon atom which is in turn directly linked by a single bond to the benzene nucleus. These preferred alkyl benzene hydroperoxides, that is, $\alpha,\alpha$-dialkylphenylmethyl hydroperoxides, are represented by the above formula II when both of the radicals $R^1$ and $R^2$ are the same or different members of the group consisting of alkyl and cycloalkyl radicals.

Examples of the above-defined organo hydroperoxides are:

Benzyl hydroperoxide.
p-Xylyl hydroperoxide.
α-Phenylethyl hydroperoxide.
α-Propyl benzyl hydroperoxide.
α,α-Dimethylbenzyl hydroperoxide.
α-Ethyl-α-methylbenzyl hydroperoxide.
α,α-Dimethyl-p-methylbenzyl hydroperoxide.
α,α-Dimethyl-p-isopropylbenzyl hydroperoxide.
Diphenylmethyl hydroperoxide.
1-tetralyl hydroperoxide.
α,α-Dimethylnaphthylmethyl hydroperoxide.
α,α,α',α'-Tetramethyl-p-xylylene dihydroperoxide.

Of the organo hydroperoxide compounds defined herein as suitable starting reactants, those wherein the total number of carbon atoms range from 7 to about 26, and wherein individual substituent hydrocarbon groups such as alkyl or cycloalkyl substituents contain from 1 to about 14 carbon atoms may be employed in the production of compounds of particular value in specific fields of application.

The phenolic compounds reacted with a member of the above defined class of organo hydroperoxides in accordance with the invention comprise the broad class of phenolic compounds having at least one replaceable hydrogen atom directly attached to a nuclear carbon atom of the phenolic radical. By the term "phenolic compounds" as used herein and in the appended claims is meant those organic compounds containing an aromatic radical and one hydroxyl group, said hydroxyl group being linked directly to a carbon atom contained in the nucleus of an aromatic radical. The phenolic compounds, as a class, employed as starting material in the production of bis(hydroxyaryl) compounds in accordance with the invention comprise the simplest member of the class, phenol, and the homologues and substitution products of phenol containing at least one replaceable hydrogen atom directly attached to a nuclear carbon atom in the phenolic radical. Suitable phenolic compounds comprise those wherein hydrogen atoms of the aromatic phenolic nucleus have been substituted by hydrocarbon radicals, such as alkyl, cycloalkyl, aryl, alkaryl and aralkyl groups. Suitable phenolic compounds include among others the following: phenol, the cresols, the xylenols, thymol, carvacrol, cumenol, 2-methyl-6-ethylphenol, 2,4-dimethyl-3-ethylphenyl, 4-ethylphenol, 2-ethyl-4-methylphenol, 2,3,6-trimethylphenol, 2-methyl-4-tertiary-butylphenol, 2,4-ditertiary-butyl-phenol, 4-methyl-2-tertiary-butylphenol, 2-tertiary-butyl-4-methylphenol, 2,3,5,6-tetramethylphenols, 2,6-dimethylphenol, 2,6-ditertiary-butyl-phenol, 3,5-dimethylphenol, 3,5-diethylphenol, 2-methyl-3,5-diethyl-phenol, o-phenylphenol, p-phenylphenol, the naphthols, phenanthrol, their homologues and analogues. Suitable phenolic compounds comprise those containing more than one phenolic group in each nucleus as well as polynuclear compounds having one or more than one phenolic group in each nucleus. Mixtures of the above compounds may be used as the starting phenolic reactant. Mixtures of phenolic compounds such as found in commercial products, such as cresylic acid, e. g. petroleum cresylic acids and the like may serve as the starting phenolic material of the process within the scope of the invention.

Phenolic compounds leading to products of particular value in many fields of application comprise those having a total number of carbon atoms in the range of, for example, from 5 to about 20 and wherein individual substituent hydrocarbon groups contain from 1 to about 12 carbon atoms.

The reaction of the organo hydroperoxides with a phenolic compound in accordance with the invention is carried out in the presence of an added acid-acting catalyst, for example, a hydrogen halide such as hydrogen chloride, preferably in the anhydrous state. The hydrogen chloride may be introduced into the system by presaturating the phenolic reactant therewith and/or by its direct introduction into the reaction zone continuously or incrementally during the course of the operation. The use of hydrogen chloride in amounts ranging from about 1% to about 20% by weight, and preferably from about 3% to about 10% by weight based upon the yield of bis(hydroxyaryl) compound has been found satisfactory. Greater proportions of hydrogen chloride may, however, be employed within the scope of the invention. Maintenance of a desired concentration of hydrogen chloride in the reaction mixture may be controlled by the use of superatmospheric pressure and/or the use of an appropriate solvent. Although hydrogen chloride is chosen as a preferred catalytic agent, the invention is in no wise limited to the use of only this acid-acting agent. Acidic agents such as any strong mineral acid and acid-acting condensing agents, for example, phosphoric acid, sulfuric acid, hydrobromic acid, hydrofluoric acid, nitric acid, acetyl chloride, dimethyl sulfate, $SO_2$, p-toluene sulfonic acid, boron trifluoride, boron trifluoride complexes, Friedel-Crafts-type catalysts such as AlCl₃, FeCl₃, etc. as well as material liberating an acid reacting agent under the conditions of execution of the process may be employed within the scope of the invention. Of these catalysts the strong acids, for example, those having a dissociation constant greater than $10^{-3}$, and particularly the strong mineral acids are preferred.

In addition to the acid agents, any secondary catalysts may be employed within the scope of the invention. Such secondary catalysts comprise, for example, ionizable sulfur compounds, hydrogen sulfide, alkyl mercaptans such as methyl mercaptan, ethyl mercaptan, thiophenols, mercapto-substituted aliphatic monocarboxylic acids, sulfur dioxide and the like. Such secondary catalysts may be added to either one or both of the reactants prior to their introduction into the reaction zone, or they may be separately introduced. Addition of such secondary catalysts may be made to the reaction mixture after addition of at least a substantial part of the acid catalyst.

Interaction of the above-defined organo hydroperoxide compounds with phenolic compounds in accordance with the invention is executed at a temperature in the range of, for example, from about —20° C. to about +150° C. and preferably from about 0° C. to about 70° C.

Subatmospheric, atmospheric, or superatmospheric pressures may be employed. Preferred times of contact will vary to some extent in accordance with the nature of the materials charged and specific operating conditions employed. A contact time ranging from about 10 minutes to about 170 hours, and preferably from about 1 hour to about 8 hours is satisfactory. Shorter or longer periods of contact may, however, be employed within the scope of the invention. The reaction is carried out in the presence of a substantial amount of the phenolic reactant. Thus, it is preferred to execute the reaction with a mole ratio of phenolic reactant to organo hydroperoxide of at least 1:1 and still more preferably in excess of 1:1. The mole ratio of phenolic compound to organo hydroperoxide may range, for example, from about 1:1 to about 1:10, and preferably from about 1:1 to about 1:5. In a particularly preferred method for carrying out the process of the invention the phenolic reactant is employed in substantial molar excess over the unreacted organo hydroperoxide throughout the course of the operation.

The reaction proceeds exothermically necessitating dissipation of evolved heat to obtain optimum operating conditions. In a preferred method of operation the acid catalyst is first added to the phenolic rectant and the organo hydroperoxide reactant thereafter added continuously but slowly, or incrementally, to the mixture. Maintenance of desired temperature conditions may be obtained by effecting the organo hydroperoxide addition at a lower temperature for example, from about —20° C. to about +35° C., and thereafter heating the admixture at a higher temperature within the above-defined permissible range. Other expedients which may be resorted to to obtain dissipation of exothermic heat comprise the passage of the acidified phenolic constituent through an elongated reaction zone or restricted cross-sectional area while injecting the organo hydroperoxide reactant into the reaction zone at the spaced points along the length thereof. In the latter expedient a progressively increasing temperature gradient in the direction of flow may be maintained in the reaction zone. Other suitable expedients, apparent to those skilled in the art, may be resorted to in order to assure the presence of a substantial excess of phenol over the organo hydroperoxide reactant in the reaction zone, particularly in the early stages of execution of the reaction.

Diluents which are substantially inert under conditions of execution of the reaction may be employed. Thus, one or both of the reactants may be admixed with, dissolved, or suspended in suitable solvents. Solvents for either or both reactants may be separately introduced into the reaction zone. Diluents in which either or both reactants are insoluble may be employed for the purpose of aiding in the control of temperature and of the rate of passage of reactants through the reaction zone. Such diluents may suitably be employed to maintain reactants or product components which are solid under conditions prevailing in the system in the form of a slurry. Examples of diluents which may be employed are: hydrocarbon solvents such as the paraffins; alcohols such as methyl-, ethyl-, isopropyl-, isobutyl alcohol; ethers; and the like. The separate solution, suspension, or admixture of the acid catalyst in a suitable medium, for example, an aliphatic alcohol such as ethyl alcohol, a paraffin hydrocarbon, an aliphatic ether, and the like, prior to its introduction into the reaction zone, or its admixture with one or both of the reactants, may be resorted to.

Under the above-defined conditions the organo hydroperoxide and phenolic compound will interact with the formation of a reaction mixture comprising hydroxyaryl-substituted organic compounds including hydroxyaryl-substituted compounds wherein the nuclei of two phenolic radicals are directly attached by carbon-to-carbon linkage to a single carbon atom as represented by the following empirical formula:

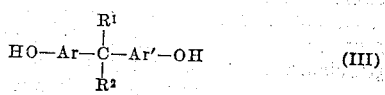
$$\mathrm{HO-Ar-\underset{R^2}{\overset{R^1}{C}}-Ar'-OH} \qquad \text{(III)}$$

wherein each R¹ and R² is the same or a different member of the group consisting of hydrogen and monovalent organic radicals including hydrocarbon radicals such as alkyl, cycloalkyl, aryl, alkaryl and aralkyl which may be saturated or unsaturated, and Ar—OH and Ar'—OH are phenolic radicals. In the bis(hydroxyaryl) methanes represented by Formula III the aryl nucleus Ar of the phenolic radiacl HO—Ar and each of the radicals R¹ and R² have the same significance as in the above defined Formula I representing the suitable organic hydroperoxide starting materials. The phenolic radical Ar'—OH in the above Formula III will correspond to the phenolic radical obtained by the removal of hydrogen from a nuclear carbon atom of the phenolic compound used as a starting reactant. Hydroxyphenyl-substituted compounds, having a specifically desired composition and structure, are therefore obtained in accordance with the invention by the judicious selection of specific organo hydroperoxide and phenolic starting reactants. Thus, the interaction of unsubstituted phenol with an alkyl phenyl hydroperoxide such as, for example, α,α-dimethylbenzyl hydroperoxide (cumene hydroperoxide) will result in reaction products comprising gem-(4-hydroxyphenyl) propane. The reaction products obtained will generally comprise isomeric forms of the bis(hydroxyaryl) compounds. Thus, the interaction of unsubstituted phenol with α,α-dimethylbenzyl hydroperoxide in accordance with the invention, the reaction products will comprise a mixture of bis(4-hydroxyphenyl) alkane and bis(2-hydroxyphenyl) alkane, in which the former will generally greatly predominate.

Without intent to limit in any wise the scope of the application by theory advanced herein to set forth more fully the nature of the invention, it is believed that the reaction mechanism involved in the interaction of the phenolic compound and the organo hydroperoxide in accordance with the invention is not straight forward, but, nevertheless permits an overall representation by the following empirical equation:

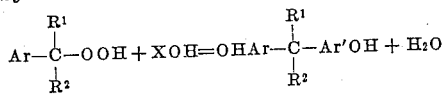

wherein the radicals Ar, $R^1$, and $R^2$ and the phenolic group Ar'OH have the same significance as in the foregoing empirical formulas I and III and XOH represents the phenolic reactant which upon removal of a nuclear hydrogen atom therefrom yields the radical Ar'OH of the above equation.

The process of the invention may be executed in batch, semi-continuous, or continuous operation. The reaction may be carried out in any suitable type of apparatus comprising a reaction zone enabling suitable contact of reactants and maintenance of the desired reaction conditions. The reaction zone employed may comprise a zone of enlarged cross-sectional area, such as, for example, a reaction chamber or autoclave, and/or a zone of restricted cross-sectional area such as, for example, a tabular reactor or coil, the external wall surfaces of which are preferably in contact with a heat controlling medium. Suitable means may be provided for maintaining reactants in intimate contact with each other. Reaction chambers may be provided with suitable stirring means, or the reactants may be maintained in a state of agitation by provision of suitable means for maintaining a circulating stream thereof through the reaction zone.

The reaction mixture produced comprising the desired bis(hydroxyaryl) compounds, for example, bis(hydroxyphenyl) alkanes is passed from the reaction zone into a suitable product separating zone. The reaction mixture will generally comprise, in addition to the desired bis(hydroxyphenyl) alkanes, some unconverted reactants, catalyst and by-products. Separation of the desired bis(hydroxyphenyl) alkanes from the reaction mixture may comprise one or more such steps, such as, for example, neutralization, stratification, titration, decantation, distillation, fractionation, solvent extraction, extractive distillation, and the like. Unconverted charge, such as, for example, phenolic material as well as any residual catalyst, such as hydrogen chloride, which is separated from the reaction mixture may be returned to the reaction zone.

The following examples are illustrative of the invention.

*Example I*

A suspension of 5.4 g. of phenol in 0.92 g. of concentrated hydrochloric acid was heated on a water bath to a temperature of 45° C. To the warmed suspension there was added dropwise over a period of 15 minutes 3.5 g. of α,α-dimethylbenzyl hydroperoxide (cumene-hydroperoxide). The resulting clear solution, after standing for forty-eight hours at room temperature, was poured into water at room temperature.

The organic phase was separated from the aqueous phase. Crystallization of the organic phase occurred. The crystallized product was identified as the addition compound of 2,2-bis(4-hydroxyphenyl) propane with phenol, the melting point range of which, determined by rapid heating, was found to be 113–116° C. Upon being heated slowly the addition compound liberated phenol, leaving 2,2-bis(4-hydroxyphenyl) propane having a melting point range of 146–153° C.

*Example II*

5.4 g. of phenol was admixed with .93 g. concentrated hydrochloric acid. The mixture was cooled and maintained at 7° C. to 8° C. while slowly adding 5.4 g. of technical grade α,α-dimethylbenzyl hydroperoxide (69% purity) thereto. Addition of the α,α-dimethylbenzyl hydroperoxide to the phenol-HCl mixture was completed in 30 minutes. Thereafter the mixture was heated for one-half hour at 50° C. The resulting reaction products were poured into water at 50° C. An aqueous and an organic phase were formed. The aqueous phase was drawn off. Upon standing the organic phase crystallized. The crystallized product was washed with water and freed of lower boiling material including phenol by heating at 190° C. under vacuum (22 mm. pressure). The distillation residue amounting to 2.1 g. was found to be crude 2,2-bis(4-hydroxyphenyl) propane which crystallized after seeding with a crystal of 2,2-bis(4-hydroxyphenyl) propane.

*Example III*

5.4 g. of phenol was admixed with .93 g. concentrated hydrochloric acid. The mixture was cooled and maintained at 5° C. to 10° C. while slowly adding 5.4 g. of technical grade α,α-dimethylbenzyl hydroperoxide thereto. Addition of the α,α-dimethylbenzyl hydroperoxide to the phenol-HCl mixture was completed in approximately 45 minutes. Thereafter the mixture was brought to room temperature. Two drops of ethylmercaptan were added and the resulting mixture was then heated at 50° C. for 1 hour. After standing at room temperature for 96 hours the reaction mixture was poured into 200 cc. of water at 50° C. An organic phase and an aqueous phase formed. The aqueous phase was drawn off. The organic phase crystallized. Impurities including phenol were separated from the crystallized product by heating under a vacuum (22 mm. pressure) at 190° C. The residue weighing 4.55 g. was found to be crude 2,2-bis(4-hydroxyphenyl) propane. 2.9 g. of the crude product was dissolved in 47 cc. of a dilute sodium hydroxide solution at 65° C. The solution was acidified with 2N.HCl. An oily layer formed and crystallized. The crystallized material was recrystallized from a large quantity of boiling water and was found to be 2,2-bis(4-hydroxyphenyl) propane having a melting point temperature range of 147–152.5° C.

*Example IV*

5.4 g. of phenol was suspended in 0.92 g. of concentrated hydrochloric acid. The suspension was cooled and maintained at 7° C. to 8° C. while 5.1 g. of technical grade α,α-dimethylbenzyl hydroperoxide was added dropwise thereto. Thereafter the temperature of the mixture was brought to room temperature (23° C.). Anhydrous hydrogen chloride was bubbled into the mixture at room temperature until the mixture was saturated with HCl. The reaction mixture was then poured into water at 50° C. An organic phase and an aqueous phase formed. The aqueous phase was drawn off. Crystallization of the organic phase took place. The crystallized product was heated at 190° C. under vacuum (21 mm. pressure) to drive off impurities including phenol. The residue amounting to 4.43 g. was found to be crude 2,2-bis(4-hydroxyphenyl) propane. The crude 2,2-bis(4-hydroxyphenyl) propane was purified by extraction in the solid state with normal heptane. The melting point of the purified 2,2-bis(4-hydroxyphenyl) propane was found to be 145–152° C. The mixed melting point temperature range of the purified product with pure 2,2-bis(4-hydroxyphenyl) propane was found to be 150–155° C. The purified product was analyzed by the micro combustion method and was found to contain 78.7% carbon and 7.1% hydrogen, which is in close agreement with the calculated values for bis(hydroxyphenyl) propane, which are 78.9% carbon and 7.1% hydrogen.

*Example V*

5.4 g. of phenol was dissolved in 3.0 cc. of anhydrous ethyl alcohol. The solution was saturated with HCl by bubbling in anhydrous hydrogen chloride at 23° C. The mixture was then cooled and maintained at a temperature of 7° to 8° C. while 5.1 g. of technical grade α,α-dimethylbenzyl hydroperoxide (69% purity) was added dropwise thereto. The resulting reaction mixture crystallized at room temperature. The crystallized product was washed with water. Impurities lower boiling than 2,2-bis(4-hydroxyphenyl) propane were flashed off by vacuum flashing at 160° C. (0.5 mm. pressure). The residual material amounted to 5.4 g. and crystallized upon cooling. It was further purified by extraction with boiling n-heptane and found to consist essentially of 2,2-bis(4-hydroxyphenyl) propane having a melting point temperature range of 150–151° C.

*Example VI*

2,2-bis(4-hydroxyphenyl) propane was prepared by reacting phenol with α,α-dimethylbenzyl hydroperoxide substantially as in Example V with the exception that toluene was used instead of ethyl alcohol as solvent for the phenol. A yield of 6.7 g. of crude 2,2-bis(hydroxyphenyl) propane was obtained. 5.78 g. of the product was subjected to solvent extraction in a Soxhlet apparatus with n-heptane. The extraction yielded:

3.79 g.—2,2-bis(4-hydroxyphenyl) propane melting point: 151–152.5° C.
0.75 g.—p(α,α-dimethylbenzyl) phenol
1.24 g.—normally liquid oily product

*Example VII*

9.8 g. of phenol was suspended in 2.84 g. of 80% aqueous $H_2SO_4$ and the mixture cooled to approximately 7° to 8° C. 5.1 g. of technical grade α,α-dimethylbenzyl hydroperoxide (69% purity) was added dropwise to the suspension. After the addition the resulting mixture was heated for 6 hours at 55° C., the reaction mixture crystallized upon cooling. The crystallized product was washed consecutively with water and aqueous sodium bicarbonate solution. Relatively volatile components including phenol were distilled from the product by heating at 180° C. at a pressure of 0.5 mm. Hg. The residual product amounting to 3.2 g. was found to be slightly impure crude 2,2-bis(4-hydroxyphenyl) propane. By-products taken overhead during the heating under vacuum comprised p(α,α-dimethylbenzyl) phenol.

The operation was repeated under substantially identical conditions but with the exception that 2 drops of ethyl mercaptan were added to the reaction mixture immediately after completing the α,α-dimethylbenzyl hydroperoxide addition to the acidified phenol. A yield of 2,2-bis(4-hydroxyphenyl) propane of 4.7 g. was obtained having a melting point temperature range of 147–149° C.

Similarly prepared are the bis(hydroxyphenyl) alkanes set forth in the following Table I. The reference numerals listed in the third and fourth columns of Table I opposite each bis(hydroxyphenyl) alkane identify the similarly numbered compounds in Tables II and III, the interaction of which under the above-defined conditions results in the bis(hydroxyphenyl) alkane.

TABLE I

| | Identification by Reference Number of Compounds Similarly Numbered in Tables II and III | |
|---|---|---|
| (1) 1,1-bis (4-hydroxyphenyl) butane | 10 | 15 |
| (2) 2,2-bis (3-methyl-4-hydroxyphenyl) propane | 10 | 15 |
| (3) 2,2-bis (3-isopropyl-4-hydroxyphenyl) propane | 11 | 16 |
| (4) bis (3-methyl-4-hydroxyphenyl) methane | 12 | 17 |
| (5) 2,2-(4,4'-dihydroxy-3-methyl-diphenyl) propane | 13 | 16 |
| (6) 2,2-(4,4'-dihydroxy-3-isopropyl-diphenyl)-propane | 11e | 15 |
| (7) 2-(4-hydroxyphenyl)-2-(2-methyl-4-hydroxyphenyl) propane | 12 | 15 |
| | 11e | 15 |

TABLE II

10 α-Propyl-benzyl hydroperoxide.
11 α,α-Dimethyl-o-methylbenzyl hydroperoxide.
12 α,α-Dimethyl-o-isopropylbenzyl hydroperoxide.
13 o-Xylyl hydroperoxide.

TABLE III

15 Phenol.
16 2-methylphenol.
17 2-isopropyl phenol.

The invention claimed is:

1. The process for the production of 2,2-di(4-hydroxyphenyl) propane which comprises introducing α,α-dimethylbenzyl hydroperoxide in controlled amounts into an admixture consisting essentially of phenol and a strong mineral acid at a temperature in the range of from about −20° C. to about +35° C. to obtain a mixture wherein the mole ratio of phenol to α,α-dimethylbenzyl hydroperoxide is at least 1, maintaining said mixture at a temperature of from about 0° C. to about 150° C., thereby effecting the reaction of a α,α-dimethylbenzyl hydroperoxide with phenol with the formation of reaction products comprising 2,2-di(4-hydroxyphenyl) propane and separating 2,2-di(4-hydroxyphenyl) propane from said reaction products.

2. The process in accordance with claim 1 wherein said strong mineral acid is hydrogen chloride.

3. The process for the production of a gem, bis-di(hydroxyphenyl) alkane which comprises introducing an α,α-dialkylbenzyl hydroperoxide in controlled amounts into an admixture consisting essentially of phenol and hydrogen chloride to obtain a mixture wherein the mole ratio of said phenol to said α,α-dialkylbenzyl hydroperoxide is at least 1, maintaining the resulting mixture at a temperature in the range of from about −20° C. to about 150° C., thereby reacting said α,α-dialkylbenzyl hydroperoxide with said phenol with the formation of reaction products comprising a gem, bis-di(hydroxyphenyl) alkane, and separating said gem, bis-di(hydroxyphenyl) alkane from said reaction products.

4. The process for the production of 2,2-di(4-hydroxyphenyl) propane which comprises admixing phenol and α,α-dimethylbenzyl hydroperoxide in controlled amounts to obtain a mixture wherein the mole ratio of phenol to α,α-dimethylbenzyl hydroperoxide is at least 1, maintaining said mixture at a temperature in the range of from about 0° C. to about 70° C. in the presence of a strong mineral acid, thereby reacting α,α-dimethylbenzyl hydroperoxide with said phenol with the formation of reaction products comprising 2,2-di(4-hydroxyphenyl) propane, and separating 2,2-di(4-hydroxyphenyl) propane from said reaction products.

5. The process for the production of 2,2-di(4-hydroxyphenyl) propane in accordance with claim 4 wherein said strong mineral acid is hydrogen chloride.

6. The process for the production of a gem, bis-di(hydroxyphenyl) propane which comprises admixing an α,α-dimethylbenzyl hydroperoxide and a phenol in controlled amounts to obtain a mixture wherein the mole ratio of said phenol to said α,α-dimethylbenzyl hydroperoxide is at least 1, maintaining said mixture at a temperature of from about −20° C. to about 150° C. in the presence of added hydrogen chloride, thereby reacting said α,α-dimethylbenzyl hydroperoxide with said phenol with the formation of reaction products comprising a gem, bis-di(hydroxyphenyl) propane, and separating said gem, bis-di(hydroxyphenyl) propane from said reaction products.

7. The process for the production of a gem, bis-di(hydroxyphenyl) alkane which comprises admixing an α,α-dialkylbenzyl hydroperoxide and a phenol in controlled amounts to obtain a mixture wherein the mole ratio of said phenol to said α,α-dialkylbenzyl hydroperoxide is at least 1, maintaining said mixture at a temperature of from about −20° C. to about 150° C. in the presence of added hydrogen chloride, thereby reacting said α,α-dialkylbenzyl hydroperoxide with said phenol with the formation of reaction products comprising a gem, bis-di(hydroxyphenyl) alkane, and separating said gem, bis-di(hydroxyphenyl) alkane from said reaction products.

8. The process for the production of a bis, dihydroxyphenyl compound which comprises admixing a benzyl hydroperoxide and a phenol in controlled amounts to obtain a mixture wherein the mol ratio of said phenol to said benzyl hydroperoxide is at least 1, maintaining said mixture at a temperature of from about −20° C. to about 150° C. in the presence of added strong mineral acid, thereby reacting said α,α-benzyl hydroperoxide with said phenol with the formation of reaction products comprising a bis, di-hydroxyphenyl compound, and separating said bis, dihydroxyphenyl compound from said reaction products.

9. The process for the production of a bis, dihydroxyaryl compound which comprises admixing an aralkyl hydroperoxide and a phenol in controlled amounts to obtain a mixture wherein the mole ratio of said phenol to said aralkyl hydroperoxide is at least 1, maintaining said mixture at a temperature of from about −20° C. to about 150° C. in an acid medium, thereby reacting said aralkyl hydroperoxide with said phenol with the formation of reaction products comprising a bis, di-hydroxyaryl compound, and separating said bis, di-hydroxyaryl compound from said reaction products.

PHILIP H. DEMING.
HANS DANNENBERG.

References Cited in the file of this patent

UNITED STATES PATENTS

| Number | Name | Date |
|---|---|---|
| 1,977,627 | Greenhalgh | Oct. 23, 1934 |

FOREIGN PATENTS

| Number | Country | Date |
|---|---|---|
| 629,429 | Great Britain | Sept. 20, 1949 |